Figure 1:
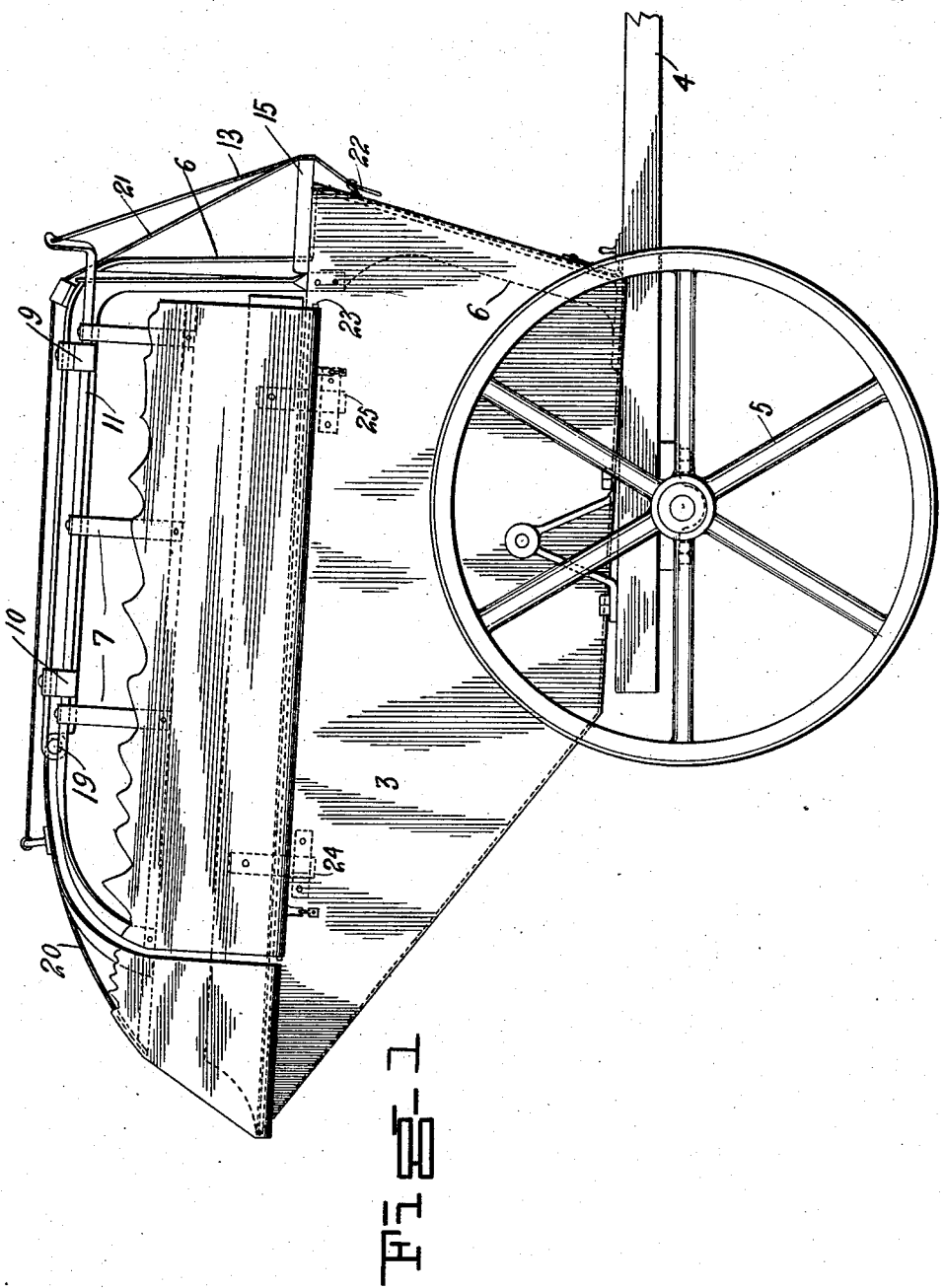

L. WITKOWSKI.
VEHICLE.
APPLICATION FILED OCT. 24, 1910.

1,186,870.

Patented June 13, 1916.
2 SHEETS—SHEET 1.

WITNESSES:

Leon Witkowski, INVENTOR

BY

ATTORNEY

L. WITKOWSKI.
VEHICLE.
APPLICATION FILED OCT. 24, 1910.
1,186,870.
Patented June 13, 1916.
2 SHEETS—SHEET 2.
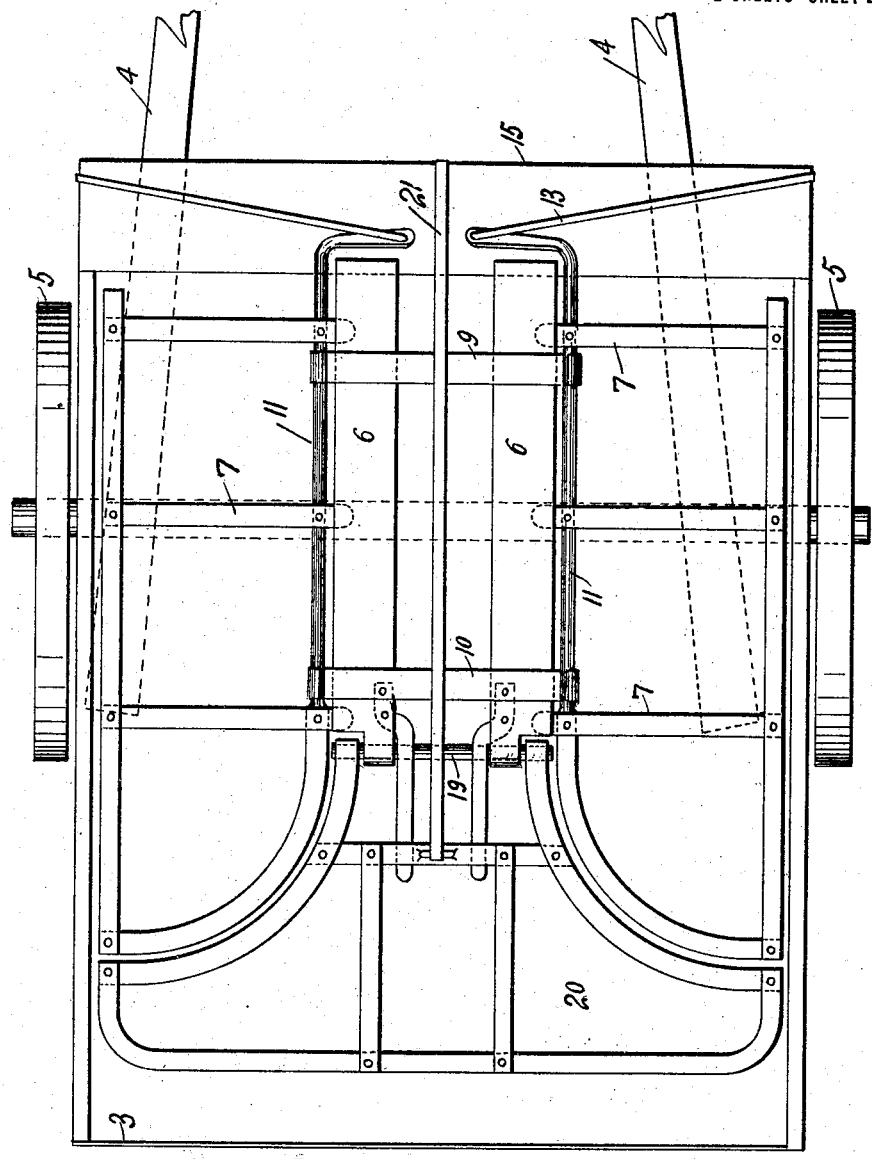
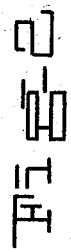
WITNESSES:
INVENTOR
BY
ATTORNEY
THE COLUMBIA PLANOGRAPH CO., WASHINGTON, D. C.

UNITED STATES PATENT OFFICE.

LEON WITKOWSKI, OF NEW YORK, N. Y.

VEHICLE.

1,186,870.   Specification of Letters Patent.   Patented June 13, 1916.

Application filed October 24, 1910. Serial No. 588,805.

*To all whom it may concern:*

Be it known that I, LEON WITKOWSKI, a citizen of the United States, residing at New York city, in the county of New York and State of New York, have invented certain new and useful Improvements in Vehicles, of which the following is a specification, reference being had therein to the accompanying drawing.

My invention relates to improvements in vehicles and has particular reference to vehicles of a class generally known as dumping wagons, particularly those employed for carting ashes, etc.

In removing ashes it is customary to drive the cart through the streets and dump the ashes from barrels and other receptacles into the cart. This causes clouds of dust to rise and spread into the houses.

One of the objects of the present invention is to provide a suitable hood or canopy to cover the cart so that either side or the back can be lifted the required height for dumping ashes, etc.

To this end I have shown in Figure 1 in the accompanying drawings a side elevation of a dumping cart partly broken away illustrating an application of my invention and Fig. 2 is a plan view of the same.

3 is the body of the cart, 4 the usual shafts and 5 the wheels thereof.

6 are uprights secured in the front of the cart and extending rearwardly over the same providing support for the wings 7. These wings are preferably provided with cross pieces such as 9 and 10 forming hinge bearings for the wings in which the rods 11 may be mounted. These rods are preferably bent at right angles at the front and to the ends may be secured suitable straps such as 13 or other means for operating the same may be employed so that by pulling the straps the wings can be elevated or dropped at will. When in the elevated position, these straps may be held by suitable projections or hooks.

19 is another bar at the back of the supports 6 adapted to provide hinge bearing for the rear wing 20 which may also be elevated or dropped by the strap 21 which may be secured to a projection such as 22.

It will be understood that each of the wings are covered with canvas or other suitable material and the same applies to the front of the canopy behind the driver. The canvas also preferably extends below the edge of the wing to the top of the wagon and is preferably provided with a weighted rod such as 23 to prevent it being blown open. Straps such as 24 and 25 may also be provided to hold the canopy down in case of wind.

Of course it will be understood that various modifications may be made without departing from the spirit of the invention as set forth in the claim.

I claim:

In a vehicle of the class described, a removable cover therefor having a stationary rectangular central portion, curved sides and back hinged thereto, said sides and back also curved at adjacent edges, means in combination with said sides and back for lifting the same independently from the front of said vehicle, and a stationary front portion with curved sides extending across the front of said hinged sides.

In testimony whereof I affix my signature in presence of two witnesses.

LEON WITKOWSKI.

Witnesses:
LOUISE ENDERLE,
THOMAS A. HILL.